A. B. FIELD.
DYNAMO ELECTRIC MACHINE.
APPLICATION FILED OCT. 5, 1907.
1,067,782.
Patented July 15, 1913.
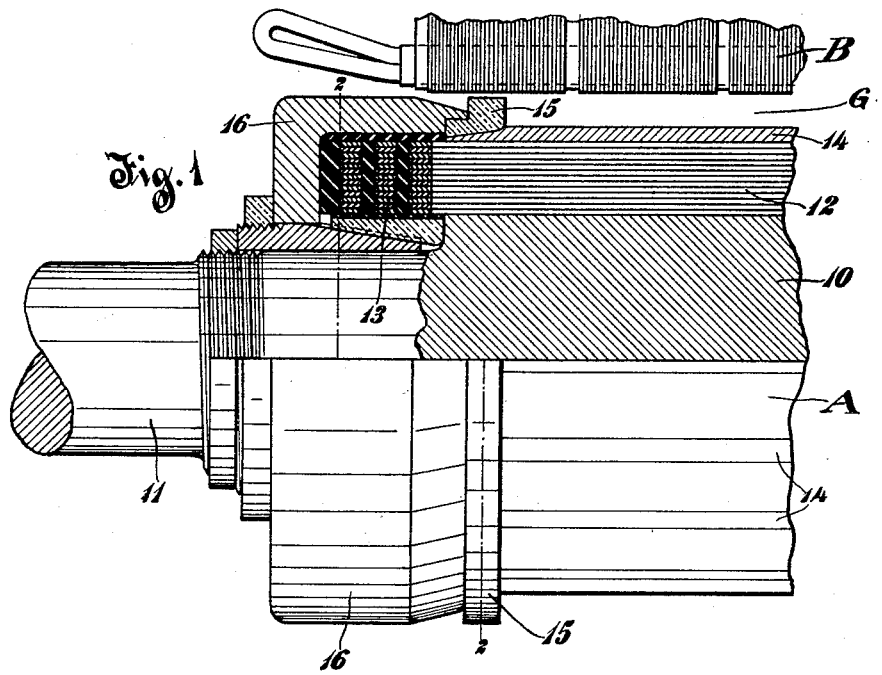
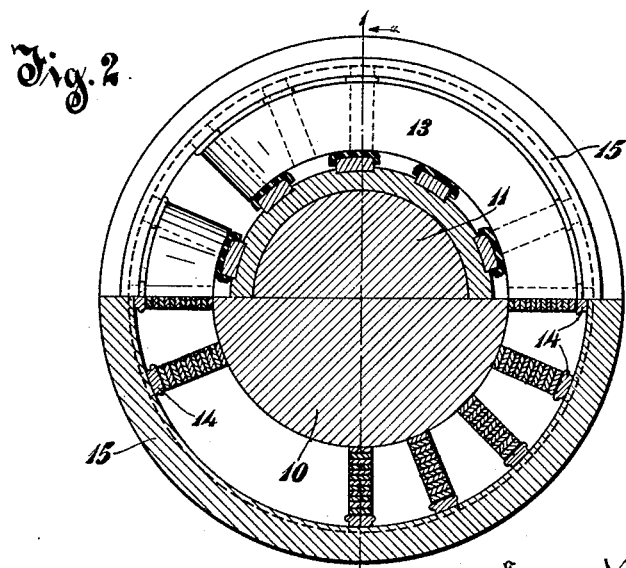
Witnesses
Oliver Sherman
Fred J. Kinsey
Inventor
Allan B. Field
By Chas. E. Lord
Attorney ALLAN B. FIELD, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO, JOINTLY.

DYNAMO-ELECTRIC MACHINE.

1,067,782.   Specification of Letters Patent.   Patented July 15, 1913.

Application filed October 5, 1907.   Serial No. 395,986.

*To all whom it may concern:*

Be it known that I, ALLAN B. FIELD, a subject of the King of England, residing at Norwood, in the county of Hamilton and State of Ohio, have invented certain new and useful Improvements in Dynamo-Electric Machines, of which the following is a full, clear, and exact specification.

My invention relates to dynamo-electric machines.

In the operation of single phase alternators, or of polyphase alternators which operate with a considerably unbalanced load, it is found that with the constructions as now used, especially those having large pole pitches such as high-speed turbo-generators, there are excessive losses. These losses arise chiefly as follows:—Currents are induced in the field poles by changes in the resultant field flux distribution as, in the relative rotation of field and armature, any point on a field pole comes opposite points of different counter magneto-motive force of the armature. These currents tend to keep the field flux distribution in the several field poles constant in spite of the varying armature reaction. To avoid excessive losses, therefore, it is necessary either, first, to cut down these currents to a minimum, allowing the flux distribution to vary, or, second, to provide paths for them of such low resistance that currents sufficient to keep the flux distribution nearly constant can flow with little loss. In some types of machines it is practically impossible to adopt the first expedient, and with ordinary constructions in these cases the currents have had to find their way as best they could through the body of the pole itself. They have therefore entailed large losses. By providing definite circuits of very low resistance in the field poles, these currents are enabled to do their work better and the losses are reduced to a minimum. To accomplish this is the object of my present invention.

The novel features of my invention will best appear from the following description and accompanying drawings and will be particularly pointed out in the claim.

Figure 1 is a partial elevation of the rotor and a fragment of the stator of a turbo-generator embodying my invention, partly in section on the line 1—1 of Fig. 2; and Fig. 2 is a section on the line 2—2 of Fig. 1, with the end-bell and its insulation removed.

The core 10 of the rotor A may be either solid or laminated and is carried in any desired manner by a shaft 11. The core 10 is provided with any desired number of slots to receive the distributed field windings 12, these windings consisting of a plurality of concentric coils for each pole and having the projecting end-turns 13. The windings 12 are held in place in the slots by bars or wedges 14, which are of some material, such as bronze or brass, which is both mechanically strong and electrically of high conductivity, and are so shaped that they will not be displaced by the action of centrifugal force. The ends of the bars 14 are tapered as shown to allow a correspondingly tapered ring 15 of copper or other good conducting material to slip over them at each end, said rings being held in place by the end bells 16 which also inclose and retain in place the end-turns 13 of the winding. The tapered joints between the rings 15 and the bars 14 make excellent electrical connections between such parts. Because of the comparatively large air gap G ordinarily used in turbo-generators, the rings 15 may extend outwardly some distance so that they may have the requisite cross section for carrying large currents. These rings may be either integral or made up of a number of sections preferably not greater than the number of poles, in the case shown, two. The two ends of the rotor are substantially alike. The rotor A is mounted to rotate within the stationary armature B.

In the operation of the machine, when any single point on a pole of the rotor comes opposite points of different counter magneto-motive force on the armature, whether such difference is due to the alternations of current in single phase machines or to an unbalanced load on the different phases in polyphase machines, currents are generated in the bars 14, and flow through circuits of very low resistance which include the bars 14 and the rings 15. These circuits are similar to short-circuited secondaries of transformers, and the currents in them oppose any changes in the field flux distribution and thus serve to prevent such changes from being caused by different counter magneto-motive forces at different points of the machine. By having these circuits of extremely low resistance, the losses because of these induced currents are greatly reduced while the effect of the currents is augmented. By the use of such low resistance circuits in the field poles, it is possible to operate single phase and unbalanced polyphase machines at much higher efficiency than has heretofore been possible.

I am aware of the well known damper or amortisseur construction for preventing hunting in alternating current machies. Although at first blush my arrangement appears to be similar to such construction, yet it is in reality widely different and serves an entirely different purpose. Amortisseurs are used to prevent hunting, and have been mainly employed in polyphase machines with comparatively well balanced loads. In the type of single phase machines and in the type of polyphase machines when the pole pitch is large or the load is unbalanced or both, amortisseurs of the usual type would introduce prohibitive losses because of the large currents caused by variations in the counter magneto-motive force at different points of the armature. On the other hand, my invention is only desirable in those very cases. In using amortisseurs it is the wish of the designer so to arrange them that no currents flow when the rotor revolves uniformly synchronously, whereas the effect of the windings as here proposed is not in any degree dependent upon variations in the angular velocity of the rotating member but will carry the currents in question at absolute synchronism.

Many modifications may be made in the precise arrangement shown and described and all such which come within the spirit and scope of my invention I aim to cover in the following claim.

What I claim as new is:—

In the rotary member of a dynamo-electric machine, a slotted field core, conductors in slots in said core and extending beyond the ends of the core, bars of low resistance material in said slots for retaining said conductors in place, the ends of said bars being tapered, other bars of low resistance material having reduced portions and engaging the tapered ends of said first mentioned bars, and rings engaging the reduced portions of said second mentioned bars for holding in place said second mentioned bars and also for holding in place the parts of the conductors which extend beyond the core.

In testimony whereof I affix my signature, in the presence of two witnesses.

ALLAN B. FIELD.

Witnesses:
  GEO. B. SCHLEY,
  FRED J. KINSEY.